United States Patent
Saint-Pierre

(10) Patent No.: US 8,749,212 B2
(45) Date of Patent: Jun. 10, 2014

(54) METHOD AND APPARATUS TO CONTROL A POWER FACTOR CORRECTION CIRCUIT

(71) Applicant: Power Integrations, Inc., San Jose, CA (US)

(72) Inventor: Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/918,715

(22) Filed: Jun. 14, 2013

(65) Prior Publication Data

US 2013/0278237 A1  Oct. 24, 2013

Related U.S. Application Data

(63) Continuation of application No. 13/212,926, filed on Aug. 18, 2011, now Pat. No. 8,487,601, which is a continuation of application No. 12/267,377, filed on Nov. 7, 2008, now Pat. No. 8,004,262.

(51) Int. Cl.
*G05F 1/00* (2006.01)

(52) U.S. Cl.
USPC .......................................... 323/266

(58) Field of Classification Search
USPC ......... 323/205, 207, 222, 232, 282, 283, 351; 363/98
See application file for complete search history.

(56) References Cited

U.S. PATENT DOCUMENTS

| | | |
|---|---|---|
| 4,437,146 A | 3/1984 | Carpenter |
| 4,940,929 A | 7/1990 | Williams |
| 5,047,912 A | 9/1991 | Pelly |
| 5,285,367 A | 2/1994 | Keller |
| 5,313,381 A | 5/1994 | Balakrishnan |
| 5,446,366 A | 8/1995 | Bassett et al. |
| 5,461,303 A | 10/1995 | Leman et al. |

(Continued)

FOREIGN PATENT DOCUMENTS

| | | |
|---|---|---|
| CN | 1742246 A | 3/2006 |
| CN | 1753290 A | 3/2006 |

(Continued)

OTHER PUBLICATIONS

STMicroelectronics "Transition-mode PFC controller", Aug. 2007 STMicroelectronics.*

(Continued)

*Primary Examiner* — Adolf Berhane
*Assistant Examiner* — Jeffrey Gblende
(74) *Attorney, Agent, or Firm* — Blakely, Sokoloff, Taylor & Zafman LLP

(57) ABSTRACT

An example on time control circuit for use in a power factor correction (PFC) controller includes an amplifier, an integrator, and a comparator. The amplifier generates an error signal that is representative of a difference between a feedback signal and a reference value. The integrator integrates a current sense signal that is representative of a current through the power switch to generate an integrator output signal. A gain of the integrator is varied in response to a voltage sense signal that is representative of a value of an input voltage of the PFC converter. The comparator generates a switch power off signal to terminate the on time of the power switch in response to comparing the integrator output signal with the error signal.

21 Claims, 11 Drawing Sheets

(56) References Cited

U.S. PATENT DOCUMENTS

| | | |
|---|---|---|
| 5,502,370 A | 3/1996 | Hall et al. |
| 5,532,918 A | 7/1996 | Mayrand et al. |
| 5,602,465 A | 2/1997 | Clemente |
| 5,612,597 A | 3/1997 | Wood |
| 5,644,214 A | 7/1997 | Lee |
| 5,734,564 A | 3/1998 | Brkovic |
| 5,742,151 A | 4/1998 | Hwang |
| 5,747,977 A | 5/1998 | Hwang |
| 5,804,950 A | 9/1998 | Hwang et al. |
| 5,867,379 A | 2/1999 | Maksimovic et al. |
| 5,886,586 A | 3/1999 | Lai et al. |
| 5,982,639 A | 11/1999 | Balakirshnan |
| 6,005,781 A | 12/1999 | Balakirshnan |
| 6,043,633 A | 3/2000 | Lev et al. |
| 6,049,473 A | 4/2000 | Jang et al. |
| 6,075,295 A | 6/2000 | Li |
| 6,198,638 B1 | 3/2001 | Lee |
| 6,212,079 B1 | 4/2001 | Balakrishnan et al. |
| 6,227,157 B1 | 5/2001 | Baumgartner et al. |
| 6,259,614 B1* | 7/2001 | Ribarich et al. ............... 363/89 |
| 6,304,462 B1 | 10/2001 | Balakrishnan et al. |
| 6,313,976 B1 | 11/2001 | Balakrishnan et al. |
| 6,351,398 B1 | 2/2002 | Balakrishnan et al. |
| 6,356,464 B1 | 3/2002 | Balakrishnan et al. |
| 6,366,481 B1 | 4/2002 | Balakrishnan et al. |
| 6,373,734 B1 | 4/2002 | Martinelli |
| 6,438,003 B1 | 8/2002 | Balakrishnan et al. |
| 6,452,366 B1 | 9/2002 | Hwang |
| 6,462,971 B1 | 10/2002 | Balakrishnan et al. |
| 6,531,854 B2 | 3/2003 | Hwang |
| 6,617,805 B2 | 9/2003 | Ribarich et al. |
| 6,657,417 B1 | 12/2003 | Hwang |
| 6,728,121 B2 | 4/2004 | Ben-Yaakov et al. |
| 6,768,655 B1 | 7/2004 | Yang et al. |
| 6,803,730 B2 | 10/2004 | Nadd et al. |
| 6,839,247 B1* | 1/2005 | Yang et al. ............... 363/21.11 |
| 6,900,623 B2 | 5/2005 | Yang et al. |
| 6,903,536 B2 | 6/2005 | Yang |
| 6,934,168 B2 | 8/2005 | Thiery et al. |
| 6,952,354 B1 | 10/2005 | Yang et al. |
| 6,956,336 B2 | 10/2005 | Ribarich |
| 6,958,920 B2 | 10/2005 | Mednik et al. |
| 6,967,851 B2 | 11/2005 | Yang et al. |
| 7,057,440 B2 | 6/2006 | Yang et al. |
| 7,064,527 B2 | 6/2006 | Adragna |
| 7,068,016 B2 | 6/2006 | Athari |
| 7,078,870 B2 | 7/2006 | Bocchiola |
| 7,088,081 B2 | 8/2006 | Takahashi et al. |
| 7,116,090 B1 | 10/2006 | Yang et al. |
| 7,148,664 B2 | 12/2006 | Takahashi et al. |
| 7,157,886 B2 | 1/2007 | Agarwal et al. |
| 7,164,590 B2 | 1/2007 | Li et al. |
| 7,164,591 B2 | 1/2007 | Soldano |
| 7,180,273 B2 | 2/2007 | Bocchiola et al. |
| 7,256,569 B2 | 8/2007 | Wu et al. |
| 7,269,038 B2 | 9/2007 | Shekhawat et al. |
| RE40,016 E | 1/2008 | Ribarich et al. |
| 7,514,912 B2 | 4/2009 | Shao et al. |
| 7,616,459 B2 | 11/2009 | Huynh et al. |
| 7,643,322 B1 | 1/2010 | Varga et al. |
| 7,750,615 B2 | 7/2010 | Jung et al. |
| 7,952,294 B2* | 5/2011 | Shteynberg et al. ........... 315/224 |
| 2002/0180520 A1* | 12/2002 | Ueno et al. ............... 330/85 |
| 2003/0222627 A1* | 12/2003 | Hwang ............... 323/222 |
| 2004/0046683 A1 | 3/2004 | Mitamura et al. |
| 2004/0113594 A1 | 6/2004 | Athari et al. |
| 2006/0061337 A1 | 3/2006 | Kim et al. |
| 2007/0085523 A1 | 4/2007 | Scoones et al. |
| 2007/0145956 A1* | 6/2007 | Takeuchi ............... 323/207 |
| 2007/0159141 A1 | 7/2007 | Shih |
| 2007/0241730 A1 | 10/2007 | Dow et al. |
| 2008/0310196 A1 | 12/2008 | Lin |
| 2009/0115400 A1* | 5/2009 | Hunter ............... 324/119 |
| 2009/0206668 A1 | 8/2009 | Dawes |
| 2010/0067270 A1 | 3/2010 | Odell |
| 2010/0118573 A1 | 5/2010 | Saint-Pierre |

FOREIGN PATENT DOCUMENTS

| | | |
|---|---|---|
| EP | 1 387 476 A1 | 2/2004 |
| JP | 06 153496 | 5/1994 |
| JP | 2001-339953 | 12/2001 |

OTHER PUBLICATIONS

"Application Note 42047: Power Factor Correction (PFC) Basics," Fairchild Semiconductor Corp., Rev. 0.9.0, Aug. 19, 2004, pp. 1-11.

"Application Note AN42009 (ML AN33): ML4824 Combo Controller Applications," Fairchild Semiconductor Corp., Rev. 1.0.3, Feb. 5, 2002, pp. 1-10.

Brown, R. et al., "One Cycle Control IC Simplifies PFC Designs," Proceedings of the Twentieth Annual IEEE Applied Power Electronics Conference and Exposition, vol. 2, Mar. 6-10, 2005, pp. 825-829.

Brown, R. et al., "Application Note AN-1077: PFC Converter Design with IR1150 One Cycle Control IC," International Rectifier, Rev. 2.3, Jun. 2005, pp. 1-18, cover.

Buso, S. et al., "Simplified Control Techniques for High-Power-Factor Flyback Cuk and Sepic Rectifiers Operating in CCM," IEEE Transactions on Industry Applications, vol. 36, No. 5, Sep. / Oct. 2000, pp. 1413-1418.

"CM6903A: Low Pin Count PFC / PWM Controller Combo," Champion Microelectronic Corp., Rev. 1.4, Oct. 20, 2008, pp. 1-15.

"FAN4803: 8-Pin PFC and PWM Controller Combo," Fairchild Semiconductor Corp., Rev. 1.2.3, Nov. 2, 2004, pp. 1-12.

"FAN4810: Power Factor Correction Controller," Fairchild Semiconductor Corp., Rev. 1.0.12, Sep. 24, 2003, pp. 1-14.

Hwang, J. et al., "New Universal Control Methods for Power Factor Correction and DC to DC Converter Applications," Proceedings of the Twelfth Annual IEEE Applied Power Electronics Conference and Exposition, vol. 1, Feb. 23-27, 1997, pp. 59-65.

"L4981A; L4981B: Power Factor Corrector," ST Microelectronics, Nov. 2001, pp. 1-16.

"L6562A: Transition-Mode PFC Controller," ST Microelectronics, Rev. 3, Aug. 2007, pp. 1-26.

"ML4821: Power Factor Controller," Micro Linear Corporation, May 1997, pp. 1-12.

"ML4824: Power Factor Correction and PWM Controller Combo," Fairchild Semiconductor Corp., Rev. 1.0.6, Nov. 7, 2003, pp. 1-15.

"ML4861: Low Voltage Boost Regulator," Micro Linear Corporation, Oct. 1996, pp. 1-11.

"NCP1651: Single Stage Power Factor Controller," ON Semiconductor Components Industries, LLC, Rev. 7, Jan. 2008, pp. 1-32.

"NCP1652: High-Efficiency Single Stage Power Factor Correction and Step-Down Controller," ON Semiconductor Components Industries, Rev. 0, Jun. 2008, pp. 1-34.

Rim, G.-H. et al., "A Simplified Analog Controller for Power Factor Correction Converters," IEEE Transactions on Industrial Electronics, vol. 42, No. 4, Aug. 1995, pp. 417-419.

International Rectifier, IR1150(S)(PbF), IR1150I(S)(PbF), "μPFC One Cycle Control PFC IC," Data Sheet No. PD60230 revC, Feb. 5, 2007, pp. 1-16.

Maksimović, D. et al., "Nonlinear-Carrier Control for High-Power-Factor Boost Rectifiers," IEEE Transactions on Power Electronics, vol. 11, No. 4, Jul. 1996, pp. 578-584.

Smedley, K. et al., "One-Cycle Control of Switching Converters," Proceedings of the 22nd Annual IEEE Power Electronics Specialists Conference, Jun. 1991, pp. 888-896.

Tang, W. et al., "Charge Control: Modeling, Analysis, and Design," IEEE Transactions on Power Electronics, vol. 8, No. 4, Oct. 1993, pp. 396-403.

Zane, R. et al., "A Mixed-Signal ASIC Power-Factor-Correction (PFC) Controller for High Frequency Switching Rectifiers," Proceedings of the 30th Annual IEEE Power Electronics Specialists Conference, vol. 1, Jun. 1999, pp. 117-122.

(56) References Cited

OTHER PUBLICATIONS

Zane, R. et al., "Modeling of High-Power-Factor Rectifiers Based on Switching Converters with Nonlinear-Carrier Control," Proceedings of the 27th Annual IEEE Power Electronics Specialists Conference, vol. 2, Jun. 1996, pp. 1105-1111.

Zane, R. et al., "Nonlinear-Carrier Control for High-Power-Factor Rectifiers Based on Up-Down Switching Converters," IEEE Transactions on Power Electronics, vol. 13, No. 2, Mar. 1998, pp. 213-221.

EP 09 17 5287—European Search Report, dated May 10, 2010, 2 pages.

EP 09 17 5256—European Search Report, dated May 11, 2010, 2 pages.

EP 09 17 5287—European Office Action dated Jul. 8, 2010, 7 pages.

EP 12175339.6—European Search Report, completed Nov. 5, 2012 (3 pages).

EP 12175339.6—European Office Action, dated Jan. 3, 2013 (7 pages).

CN 200910222204.9—First Chinese Office Action and Search Report, issued Apr. 22, 2013, with English Translation (54 pages).

JP 2009249820, First Japanese Office Action, mailed Jan. 7, 2014, with English Translation (4 pages).

\* cited by examiner

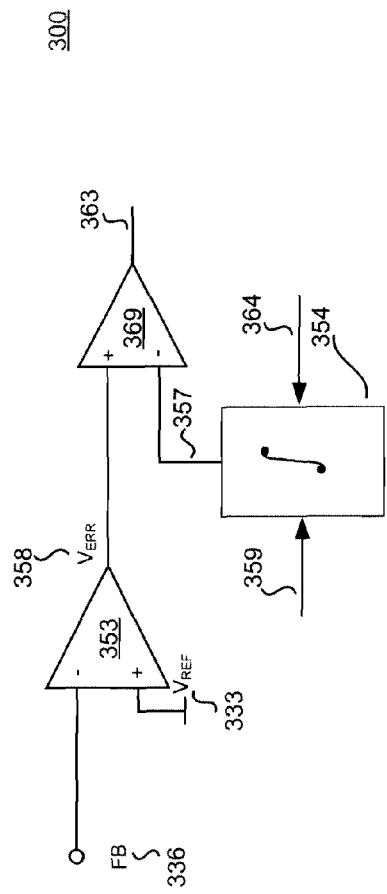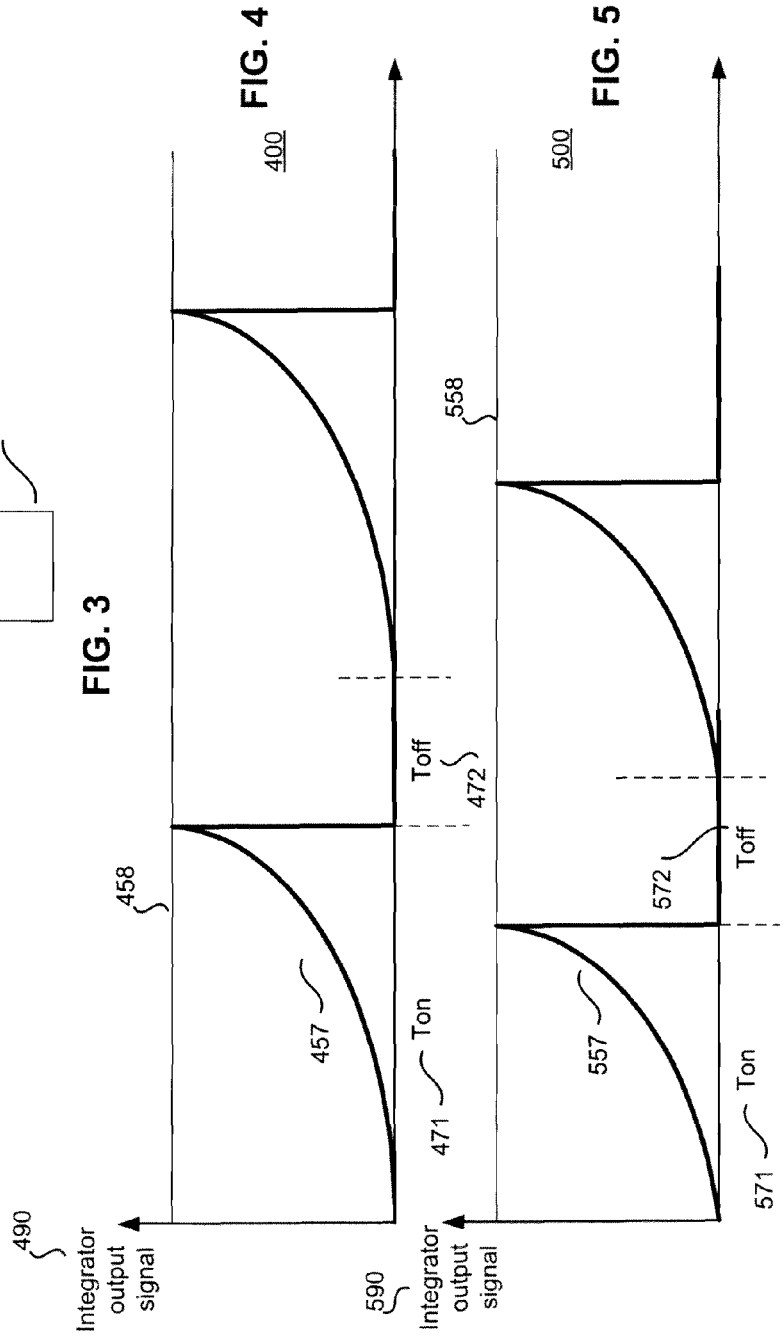

METHOD AND APPARATUS TO CONTROL A POWER FACTOR CORRECTION CIRCUIT

REFERENCE TO RELATED APPLICATIONS

This application is a continuation of U.S. patent application Ser. No. 13/212,926, filed Aug. 18, 2011, now pending, which is a continuation of U.S. patent application Ser. No. 12/267,377, filed Nov. 7, 2008, now U.S. Pat. No. 8,004,262. U.S. patent application Ser. Nos. 12/267,377 and 13/212,926 are hereby incorporated by reference.

BACKGROUND

1. Field of the Disclosure

The present invention relates generally to power supplies, and more specifically, the invention relates to power supplies that provide power factor correction.

2. Background

Power supplies are typically used to convert alternating current ("ac") power provided by an electrical outlet into direct current ("dc") to supply an electrical device or load. One important consideration for power supply design is the shape and phase of the input current drawn from the ac power source relative to the ac input voltage waveform. The voltage waveform of mains ac sources is nominally a sinusoid. However, due to the non-linear loading that many switching power supplies present to the ac source, the wave shape of the current drawn from the ac source by the power supply is non-sinusoidal and/or out of phase with the ac source voltage waveform. This leads to increased losses in the ac mains distribution system and, in many parts of the world, is now the subject of legislative or voluntary requirements that force power supply manufacturers to ensure the current drawn by the power supply is sinusoidal and in phase with the ac voltage waveform.

The correction of the input current waveform in this way is referred to as power factor correction (PFC) and often requires an input stage to the power supply specifically designed to perform the function of power factor correction. If the input ac current and voltage waveforms are sinusoidal and perfectly in phase, the power factor of the power supply is 1. In other words, a power factor corrected input will present a load to the ac source that is equivalent to coupling a variable resistance across the ac source. The resistance presented as a load to the ac source by the PFC stage is varied as a function of the rms voltage of the ac source in accordance with the power drawn by the PFC stage output load. As harmonic distortion and/or phase displacement of the input current relative to the ac source voltage increase, the power factor decreases below 1. Power factor requirements typically require power factors greater than 0.9 and may have requirements for the harmonic content of the input current waveform.

Common methods to increase the power factor of a power supply include the use of a boost converter or flyback converter to establish an input current waveform close to the ideal sinusoidal shape while being in phase with the ac source voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a portion of a functional block diagram illustrating an example controller in accordance with the teachings of the present invention;

FIG. 4 is an example integrated switch current waveform to illustrate the operation of an example controller in accordance with the teachings of the present invention;

FIG. 5 is an example integrated switch current waveform to illustrate the operation of an example controller in accordance with the teachings of the present invention;

DETAILED DESCRIPTION

Figure 1:
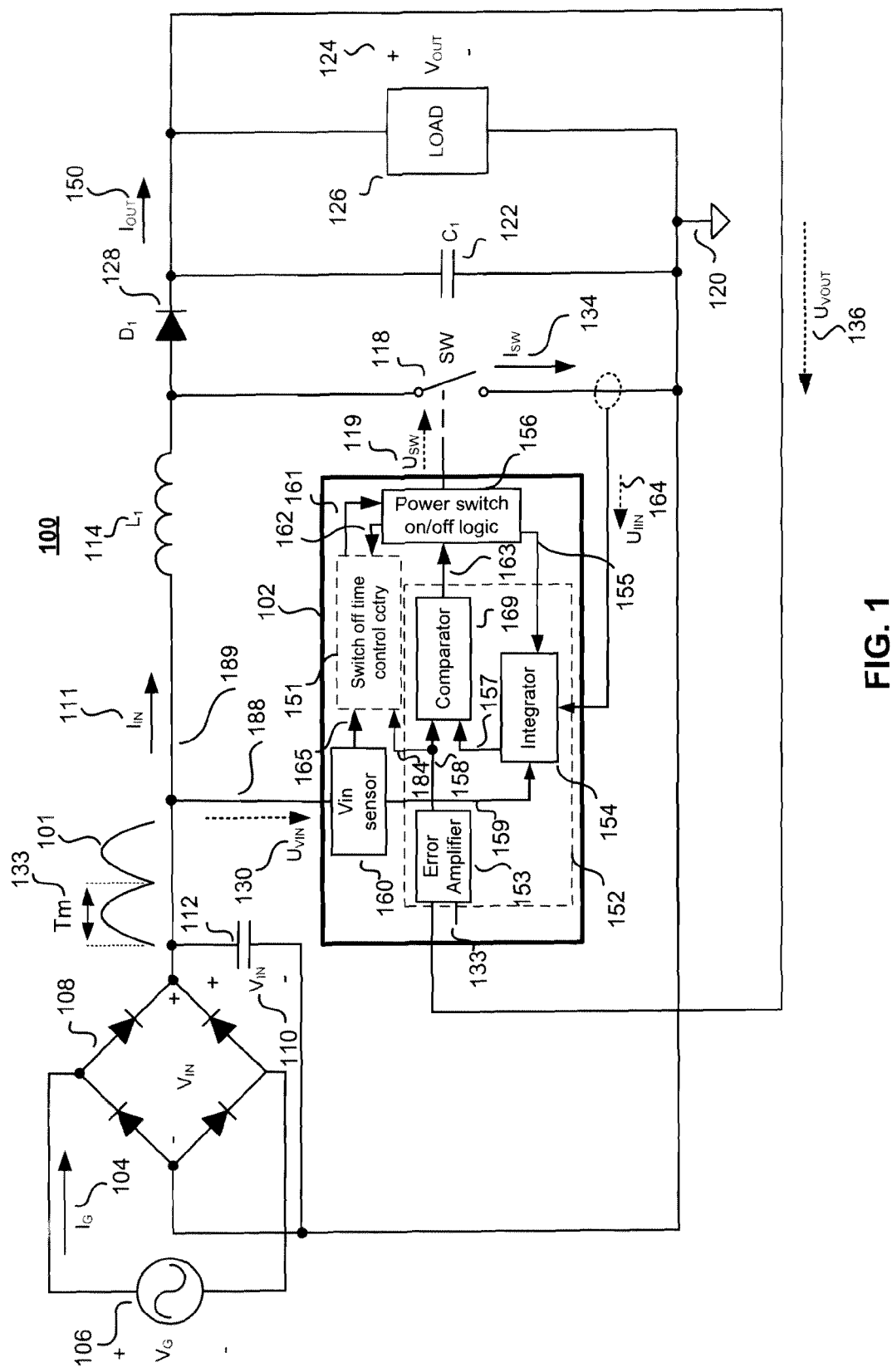
FIG. 1 illustrates an example schematic of a boost converter including an example controller in accordance with the teachings of the present invention.

In one aspect of the present invention, methods and apparatuses disclosed here for explanation purposes use a power converter to provide power factor correction of an input current waveform. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples.

As will be discussed below, various examples in accordance with the teachings of the present invention allow a power factor correction (PFC) converter to use a control technique that reduces the dynamic range required of an internal error signal. PFC controller circuits typically operate with error signals having a very wide dynamic range to function over wide load and input voltage ranges. In the context of a power conversion circuit, an error signal is a signal that is derived by amplifying a difference between a feedback signal and an internal reference level and used to control the power converter in order to reduce the difference.

For example, in a PFC converter the output voltage of the converter is typically controlled to have a substantially constant nominal value regardless of load conditions. Any changes in output load conditions will tend to cause the output voltage to change (e.g., a sudden increase in output load will cause the output voltage to drop), which in turn causes a voltage feedback signal to change and therefore also causes the error signal to change. The controller modifies the power converter operation in response to this change in error signal in order to bring the output voltage back to its nominal value.

In a typical control circuit, an error voltage signal value of 5 V is generated in a PFC converter operating with full output load and at low input voltage (e.g., 85 V ac). However, the error voltage signal value is just 125 mV when the output load is 20% of full load at high input voltage (e.g., 265 V ac). This error voltage signal will be even lower at lighter load conditions. With such wide signal ranges, it is difficult to optimize the control loop stability and response over a wide input voltage and load range. Furthermore operation with very low value signals can lead to electrical noise sensitivity, which is a concern in applications such as PFC circuits where high voltage, fast switching waveforms create significant electrical noise.

In accordance with the teaching of the present invention, in one example, a signal responsive to the value of the input voltage to the power converter is coupled to adjust the gain of an integrator circuit coupled to integrate a current signal generated from a current flowing in a power switch of the converter. The output of the integrator circuit is compared to the error voltage signal to determine the time at which the power switch is to be turned off each switching cycle. By making the integrator circuit gain responsive to the power converter input voltage, in one example, the value of the error voltage signal for a specific power converter output load condition is substantially constant independent of the power converter input voltage. This greatly reduces the dynamic range required of the error signal by substantially removing any variation as a function of power converter input voltage.

In one example, therefore, the error signal value is substantially proportional to load but independent of the power converter input voltage. Having a signal that is proportional to the power converter load magnitude is useful so that functions and features that require information on the power converter output load conditions can make use of such a signal as a control input. In one example, a feature that can use an error signal that is substantially proportional to power converter output load magnitude is a feature that reduces the power converter average switching frequency as the output load decreases. This reduced average switching frequency operation is beneficial in maintaining high power converter efficiencies under light load or standby conditions, which is becoming a requirement in many applications such as TV power supplies and personal computer power supplies.

To illustrate, FIG. 1 shows generally a functional block diagram of an example controller 102 included in a power converter 100 in accordance with the teachings of the present invention. In the example shown, power converter 100 is a boost converter that receives an ac line current $I_G$ 104 and an ac line voltage $V_G$ 106 at the input of the power converter 100. Typically, ac line current $I_G$ 104 and ac line voltage $V_G$ 106 are provided by an electrical distribution system (e.g., power plant) through an electrical socket. As shown, a bridge rectifier 108 converts ac line voltage $V_G$ 106 to a substantially unsmoothed dc input voltage waveform 101 of magnitude $V_{IN}$ 110. In the illustrated example, capacitor 112 is of very low value and for the purpose of filtering high frequency noise currents and offers substantially no smoothing of the rectified voltage waveform 101.

As shown in the example of FIG. 1, an energy storage element, shown as an inductor $L_1$ 114, is coupled to bridge rectifier 108 at one end and a power switch SW 118 at an opposite end. In operation, power switch SW 118 is in an 'on' or 'closed' state when switch 118 is able to conduct current and in an 'off' or 'open' state when switch 118 in unable to conduct current. In the example, an input return 120 is coupled to power switch SW 118. In operation, current flows through energy storage element 114 when SW 118 is on and current flows through energy storage element 114 and output diode $D_1$ 128 for at least a portion of the time for which power switch SW 118 is off. In the illustrated example, therefore, the energy storage inductor $L_1$ 114 transfers energy to an output of the power converter 100 in response to the switching of power switch SW 118 in accordance with the teachings of the present invention. In the example, therefore, power converter 100 is coupled to transfer energy from the source of ac voltage 106 to the load 126, wherein the magnitude of energy flowing is a function of the magnitude of the load, which in one example is a function of output voltage $V_{OUT}$ 124 and output current $I_{OUT}$ 150.

As shown in the example, a bulk capacitor 122 is coupled to supply a substantially constant output voltage $V_{OUT}$ 124 to a load 126. In one example, load 126 may be an input to a dc-dc power supply. In the example of FIG. 1, an input voltage signal $U_{VIN}$ 130, representative of dc input voltage $V_{IN}$ 110, is received by controller 102. In the example, dc input voltage 110 is responsive to the magnitude of the ac input voltage 106. As shown, a power switch current sense signal $U_{IIN}$ 164 is also received by controller 102. More specifically, a current sense circuit such as for example, a current transformer, or a voltage across a discrete sense resistor coupled to power switch 118, or a voltage signal generated across power switch 118 when the power switch is on or conducting, or a senseFET element of power switch 118, or a senseFET portion of power switch 118 may be used to generate a current sense signal 164 responsive to power switch current $I_{SW}$ 134. In the example of FIG. 1, an output voltage signal $U_{VOUT}$ 136, representative of output voltage $V_{OUT}$ 124, is also received by controller 102. According to the example teachings of the present invention, sense signals $U_{VIN}$ 130, $U_{IIN}$ 164, and $U_{VOUT}$ 136 may be in the form of voltages or currents.

In one example, controller 102 outputs a switching signal $U_{SW}$ 119 that controls a switching of power switch SW 118 in response to the input voltage signal $U_{VIN}$ 130, the input current signal $U_{IIN}$ 164, and the output voltage signal $U_{VOUT}$ 136 in order to regulate the output voltage $V_{OUT}$ 124 and control the dc input current $I_{IN}$ 111 to be proportional to dc input voltage $V_{IN}$ 110, also referred to as 'input voltage $V_{IN}$ 110.' More specifically, in the example shown, controller 102 regulates output voltage $V_{OUT}$ 124 and controls dc input current $I_{IN}$ 111 by controlling each switching cycle of switch SW 118.

A switching cycle is defined as a time period when the switch is on and a subsequent time period when the switch is off. For example, a switching cycle may include an on time period when switch SW 118 is able to conduct, followed by an off time period when switch SW 118 is unable to conduct. In another example, a switching cycle may include an off time period when switch SW 118 is unable to conduct, followed by an on time period when switch SW 118 is able to conduct. An on-time may be defined as the time period switch SW 118 is conducting during a switching cycle and an off-time may be defined as the time period switch SW 118 is not conducting during a switching cycle.

In the example of FIG. 1, controller 102 includes power switch on/off logic 156 and switch off time control circuitry 151 circuit blocks. According to the teachings of the present invention, controller 102 includes a voltage sensor circuit 160 and switch on time control circuit 152. Circuit block 152 includes an integrator circuit 154, error amplifier 153 and comparator 169 that couples power switch off signal 163 to power switch on/off logic block 156. In one example, switch off time control circuit block 151 couples power switch on signal 161 to power switch on/off logic block 156 to start the next power switch 118 switching cycle period.

In the example of FIG. 1, the integrator circuit 154 has inputs coupled to receive the current sense signal 164 and a voltage sense signal 159 and provides an output signal 157 coupled to one input of comparator 169. The controller 102 is coupled to terminate an on time of the power switch 118 when the integrator output signal 157 reaches a threshold value. In one example, this threshold value is the value of the output signal 158 of error amplifier 153. In the example, the gain of the integrator circuit 154 is responsive to the voltage sense signal 159 such that the threshold value of the output signal 157 is substantially constant independent of the magnitude of the ac input voltage 106 when the magnitude of the load 126 is substantially constant.

In the example of FIG. 1, the input voltage sense signal 159 is not representative of the instantaneous input voltage $V_{IN}$ 110 at any instant in time, but rather, is a value that typically remains substantially constant over many half cycle periods, Tm 133, of the input ac voltage, such as for example an rms voltage value, an average voltage value or a peak voltage value. Vin sensor circuit 160 is therefore coupled to generate a voltage sense signal, for example, responsive to one of an rms voltage value, an average voltage value or a peak voltage value of the input voltage source voltage 106. It should be noted that in other examples, it is not necessary to have a connection 188 between voltage sensor 160 and the input voltage rail 189 in order to sense the input voltage 110. In such cases, the value of the input voltage 110 can be derived by measuring the duty cycle of the power switch 118 or by measuring the slope of a current rise in the power switch 118 during an on time of the power switch 118. Such techniques can be used to sense input voltage 110 and derive a peak, rms or average value of the input voltage without requiring a connection 188.

As described above, one aim of a PFC converter circuit can be described as presenting a substantially resistive load to the input ac source. Therefore, over a half cycle period Tm 133 of the sinusoidal input ac voltage cycle, the input current $I_{IN}$ 111 should also be substantially a sinusoid and in phase with the input rectified voltage waveform 101. Since the output voltage 124 is smoothed with a bulk capacitor 122, the feedback voltage signal 136 and output signal 158 of error amplifier 153 do not vary substantially over a number of power switch 118 switching cycles. Furthermore, since voltage sense signal 159 is also substantially constant over an ac half cycle period, Tm 133, as described above, the integrator circuit 154 maximum output signal should also be substantially constant over an ac half cycle. Integration of a current/over time provides the charge Q according to equation (1) below:

$$Q = \int_0^T I \times dt \qquad (1)$$

It therefore follows that, in the controller example of FIG. 1, the charge for each power switch 118 on time is substantially constant over an input ac half cycle period, Tm 133. Since, conversely, current is equal to charge per unit of time, in order to vary the input current $I_{IN}$ 111 to be substantially a sinusoid, the overall power switch 118 switching frequency therefore varied with the rectified voltage waveform 101 in FIG. 1. In the example, this is the function of off time control circuitry 151. The power switch switching period is therefore typically highest (lowest switching frequency) at the lowest values of the input ac voltage 106 and a varies according to the magnitude of the instantaneous voltage during a half wave cycle of the input mains to provide a substantially sinusoidal input current $I_{IN}$ 111 in accordance with the teachings of the present invention.

In the example converter circuit of FIG. 1, for a given magnitude of the load 126 and therefore load current 150, the output power is substantially constant. If, however, the input voltage $V_G$ 106 is increased, the input current $I_G$ 104 will decrease since the emulated resistance that the converter 100 presents to the ac source 106 must increase to maintain constant output power. Since Power=$V^2/R$, the effective resistance R that the converter 100 present to the ac source, must increase as a square function of the input voltage $V_G$ 106. In order to maintain a substantially constant error amplifier 158 output signal independent of input voltage, a gain of integrator 154 is varied in proportion to the square of the input peak/rms or average value of input voltage 106 to ensure that despite with the lower input current $I_{IN}$ 111 as input voltage $V_G$ 106 increases, the integrator output voltage at the point that the power switch 118 on time is terminated, is substantially constant independent of the input voltage $V_G$ 106. It is noted that in a practical realization of the controller 102, the voltage sense signal 159 maybe an approximation to a square function of the input voltage signal 130. In one example the voltage sense signal 159 is a piecewise linear approximation to a square function of the input voltage signal 130.

In one example, the power switch 118 and controller 102 are integrated as two silicon die in a single package as a hybrid circuit. In another example the power switch 118 and controller 102 are integrated in a monolithic silicon die. In yet another example the power switch 118 and controller 102 are in separate silicon die in separate packages.

Figure 2:
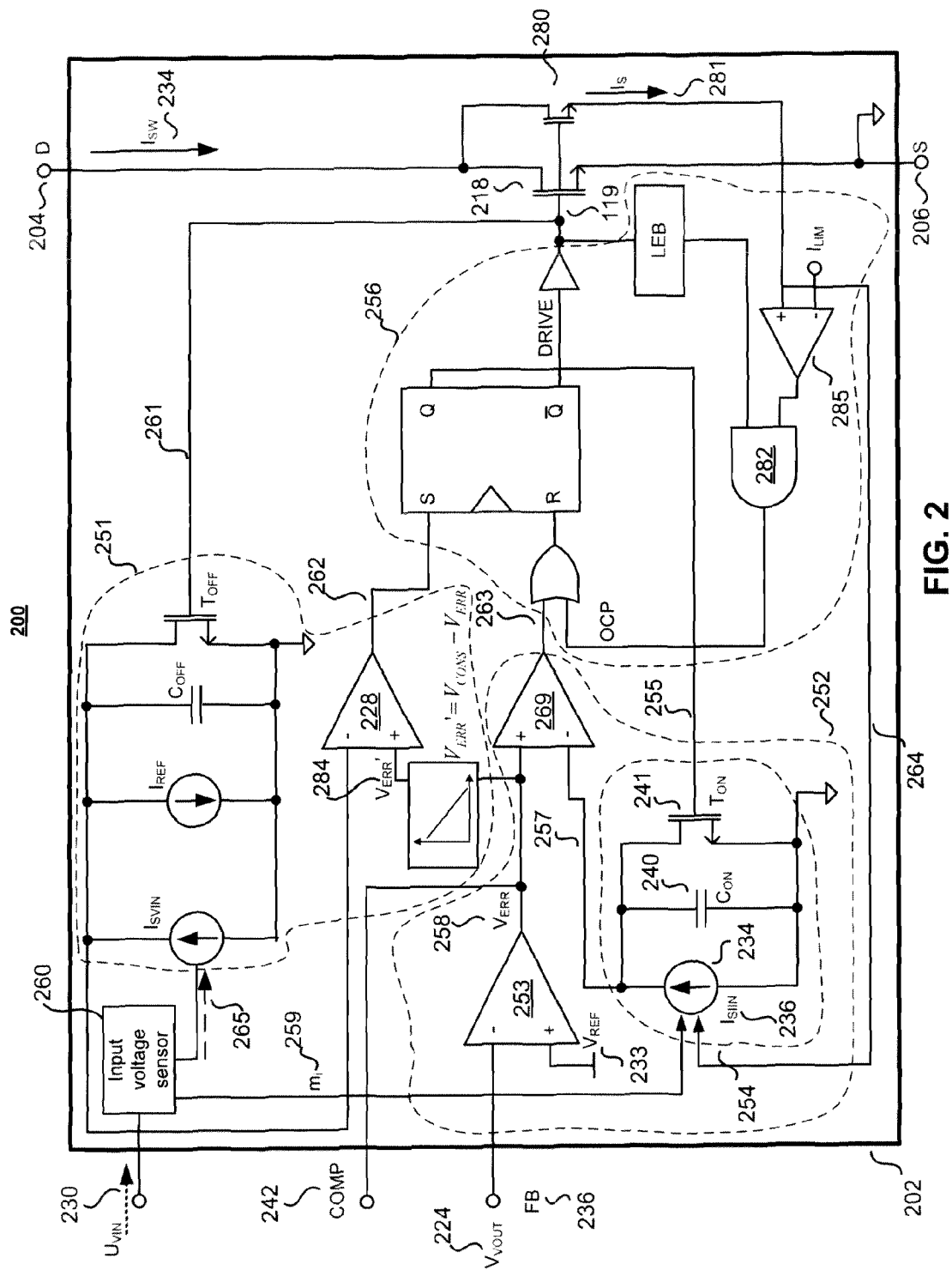
FIG. 2 is a functional block diagram illustrating an example controller in accordance with the teachings of the present invention.

FIG. 2 shows generally an example functional block diagram 200 of a controller 202, which in one example shares many aspects of the controller 102 in FIG. 1. In accordance with the teachings of the present invention, controller 202 includes a voltage sensor circuit 260 and a switch on time control circuit 252. Switch on time control circuit 252 includes an integrator circuit 254, error amplifier 253 and comparator 269 that couples power switch off signal 263 to power switch on/off logic block 256. In one example, switch off time control circuit block 251 couples power switch on signal 262 to power switch on/off logic block 256 to start the next power switch 218 switching cycle period. Integrator circuit 254 is coupled to receive current sense signal 264, which in the example is generated by senseFET element 280 of power switch 218. Integrator circuit 254 is also coupled to receive voltage sense signal 259.

At the start of each power switch 218 on time, integrator circuit capacitor 240 is reset by the action of transistor 241 being turned on by signal 255, which in one example is equivalent to signal 155 in FIG. 1. Integrator capacitor 240 is then charged by current source 234 during the on time period of power switch 218. The value of current source 234 current is responsive to both current sense signal 264 and voltage sense signal 259 in accordance with the teachings of the present invention. When the output signal 257 of integrator circuit 254 exceeds the threshold value of error signal $V_{ERR}$ 258, comparator 269 output voltage goes low and power switch on/off logic block 256 terminates the on time period of the power switch 218. As discussed with reference to FIG. 1 the gain of integrator circuit is increased according to the square of the peak/rms or average of input voltage signal 230, in order to maintain the output signal 257 of integrator circuit substantially constant at the time where the power switch 218 on time is terminated. In one example integrator capacitor 240 has a value of 10 pF and the gain factor introduced by voltage sense signal 259 is in the range of 1 to 17.5 μA/A.

With further reference to FIG. 2, in the example, the error voltage signal $V_{ERR}$ 258 is also used to vary the power switch switching cycle period as a function of output converter load. According to the teachings of the present invention, the error voltage signal $V_{ERR}$ 258 is independent of input voltage to the converter in which controller 202 is used, for example converter 100 in FIG. 1. The error voltage is therefore substantially only a function of load. By applying the error voltage signal $V_{ERR}$ 258 to off time control circuit block 251 and creating a signal $V_{ERR}'$ 284 that increases the voltage on the non-inverting input of comparator 228 as the error voltage $V_{ERR}$ 258 goes down (i.e., as output load drops). This has the effect of increasing the off time and therefore the switching period of power switch 218. It is understood that in other embodiments, the voltage of signal 284 could be held constant for one range of values of error voltage signal $V_{ERR}$ 258 and varied for another range such that the average switching frequency of power switch 218 is held constant over a certain load range and varied for another load range. Furthermore, it is understood that the variation of average power switch 218 switching frequency could be made non-linear or stepped as a function of load.

FIG. 3 shows generally some examples of the circuit blocks of, for example, the controllers discussed above in FIGS. 1 and 2, in accordance with the teachings of the present invention. The circuit 300 includes an integrator circuit 354, an error amplifier 353 and a comparator 369. A first input of the error amplifier 353 is coupled to receive a feedback signal 336 responsive to the magnitude of the dc output voltage of the power converter, which in one example could be voltage 124 in FIG. 1. A second input of the error amplifier 353 is coupled to receive a reference voltage 333, which in one example could be voltage 133 in FIG. 1. An output of the error amplifier 353 is coupled to apply error signal 358 to a first input of the comparator 369. A first input of the integrator circuit 354 is coupled to receive a current sense signal 364 responsive to a current flowing in a power switch, which in one example could be power switch 118 in FIG. 1 or 218 in FIG. 2, when the power switch is on. A second input of the integrator circuit 354 is coupled to receive a voltage sense signal 359 responsive to a magnitude of an ac input voltage, which in one example could be voltage sense signal 159 in FIG. 1, which is responsive to input voltage 106 in FIG. 1. The output of the integrator 354 is coupled to apply the integrator output signal 357 to a second input of the comparator 369.

In the example where the circuit blocks of FIG. 3 are applied in controllers 102 or 202 in FIGS. 1 and 2, the controllers are coupled to terminate the on times of the power switch 118 or 218 in FIGS. 1 and 2 when the integrator output signal 357 exceeds the threshold magnitude of the error signal 358. In one example, the gain of the integrator circuit 354 is responsive to the voltage sense signal 359 such that the magnitude of the integrator output signal 357 at the time that the power switch on time is terminated is substantially constant independent of the magnitude of the ac input voltage when the magnitude of the load is constant. In accordance with the teachings of the present invention, in one example, the gain of the integrator circuit 354 is varied as the square of the voltage sense signal 359, which in one example is linearly proportional to an input voltage, such as for example voltage 106 in FIG. 1. In another example, the voltage sense signal 359 is proportional to the square of an input voltage, such as for example voltage 106 in FIG. 1, and the gain of the integrator circuit 354 is linearly proportional to the voltage sense signal 359.

FIGS. 4 and 5 show generally example integrator output signal waveforms, which in one example could be from integrators 154, 254 or 354 in FIGS. 1, 2 and 3, with a constant load current, such as for example $I_{OUT}$ 150 in FIG. 1.

As illustrated, FIG. 4 shows an example integrator output signal waveform, when an input voltage, for example $V_G$ 106 in FIG. 1, is at a low value (e.g. 85-115 V ac). FIG. 5 shows an example integrator output signal waveform, when an input voltage, for example $V_G$ 106 in FIG. 1, is at a high value (e.g. 230 V ac). In the example shown in FIG. 5, despite the lower power switch current at high input voltage discussed with reference to FIG. 1 above, the adjusted gain of integrator circuits 154, 254 or 354 in FIGS. 1, 2 and 3 for example, results in a magnitude of the integrator output at the end of the power switch on time Ton 571, which is substantially equal to that of waveform 457 in FIG. 4 at the end of one time Ton 471. In other words, the error signals 458 and 558 are substantially the same or constant independent of input voltage, which in one example could be input voltage $V_G$ 106 in FIG. 1.

Figure 6:
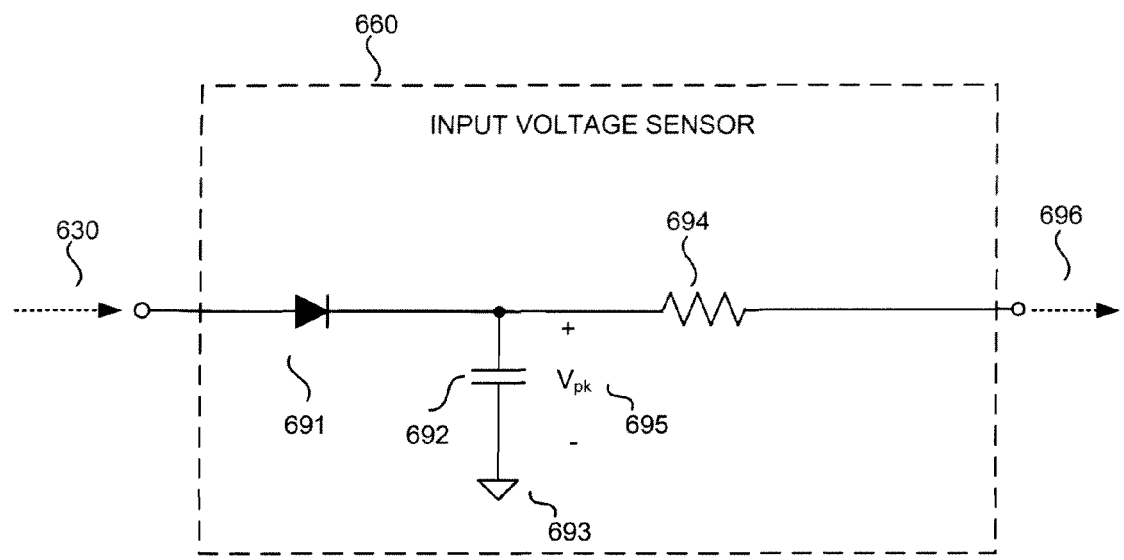
FIG. 6 is an example of a portion of an input voltage sensor circuit in accordance with the teachings of the present invention.

FIG. 6 shows generally one example of a portion of a voltage sensor circuit that in one example is equivalent to a portion of voltage sensor circuits 160 and 260 in FIGS. 1 and 2. In the case of the example circuit of FIG. 6, the output signal 696 is simply the peak value of the input signal 630, which in one example is equivalent to signals 130 and 230 in FIGS. 1 and 2. In one example, the output signal 696 is squared to form the voltage sense signals 159 and 259 in FIGS. 1 and 2. Other circuit implementations could provide an output signal that is responsive to an rms or average value of the input signal 630 while still benefiting from the teachings of the present invention. It is understood that in other examples circuit 660 could be external to the controller circuits 102 and 202 in FIGS. 1 and 2.

Figure 7:
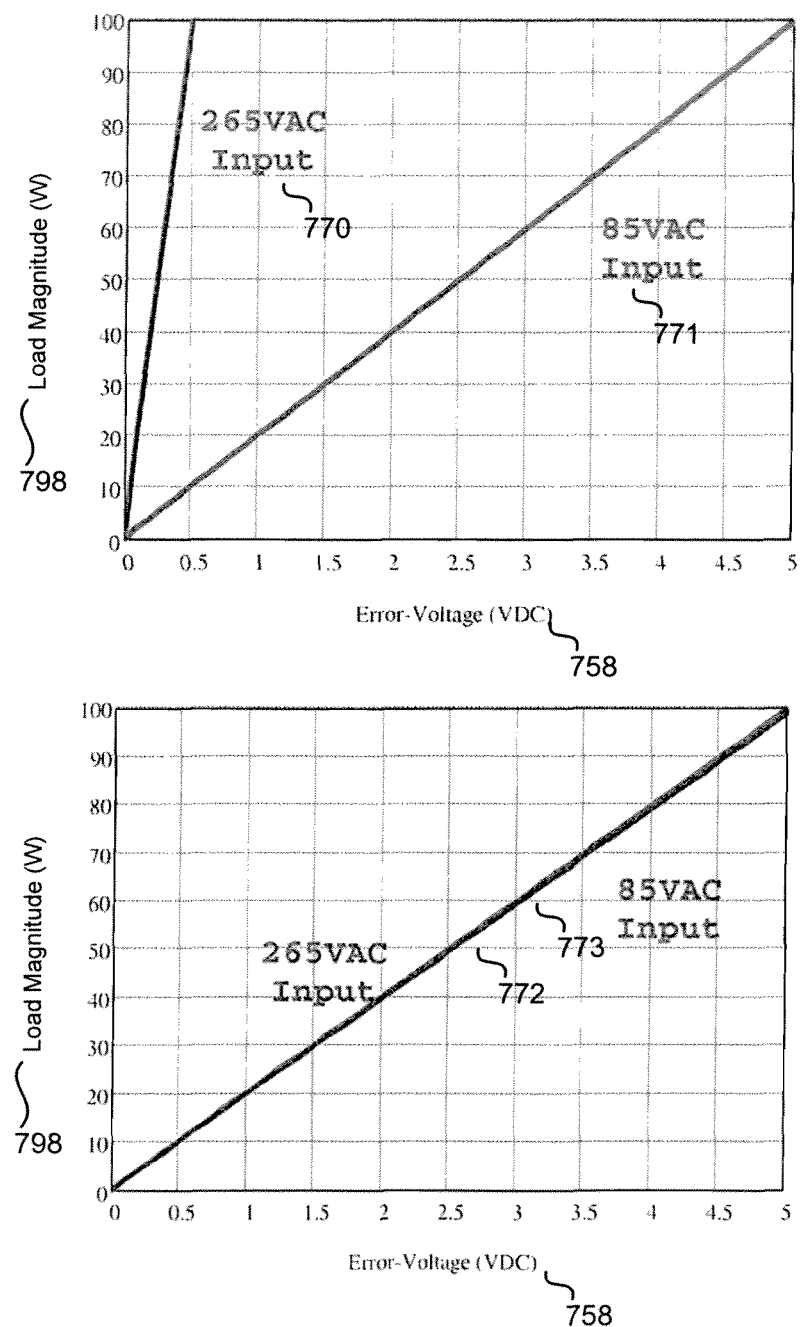
FIG. 7 shows error voltage versus load magnitude characteristics to illustrate the operation of an example controller in accordance with the teachings of the present invention.

FIG. 7 shows generally example error signal voltage versus load magnitude characteristics. Characteristics 770 and 771 illustrate typical error voltage 758 characteristics as a function of load magnitude 798 in an example controller not benefiting from the teachings of the present invention, where integrators of the type shown by blocks 154, 254 and 354 FIGS. 1, 2 and 3, instead do not receive a voltage sense signal substantially proportional to the square of a converter input ac voltage, such as for example 106 in FIG. 1. In the examples of characteristics 770 and 771, the error voltage varies dramatically under the same load conditions but under different input voltage conditions. Characteristics 772 and 773, on the other hand, are example error voltage characteristics also under different input voltage conditions as a function of load magnitude in, for example, control circuits benefiting from the teachings of the present invention such as controllers 102 and 202 in FIGS. 1 and 2. In the example, it is apparent that value of the error signal voltage 758 for a given load magnitude 798 is substantially independent of input voltage since characteristics 772 and 773 are substantially coincident.

FIGS. 8A, 8B, 9 and 10 illustrate the benefits of the teachings of the present invention to improve another power factor control scheme often referred to as "one cycle control." The details of controllers using the "one cycle control" control scheme are covered in many texts. Two example references for full descriptions of the functionality of this type of controller are "One Cycle Control IC Simplifies PFC Designs," International Rectifier Corp., as presented at APEC 05 Conference and Application Note AN-1077, International Rectifier Corp.

Figure 8A:
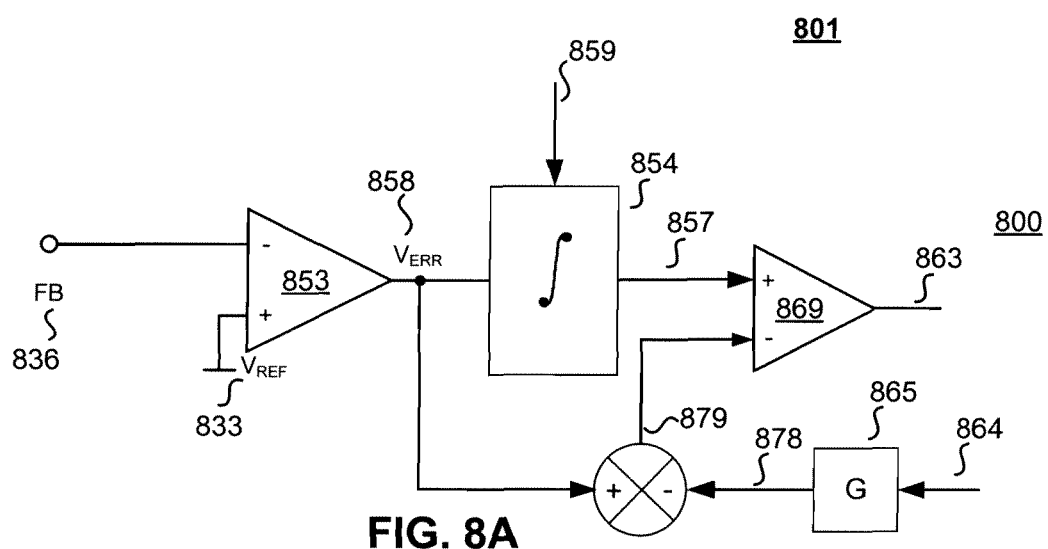
FIG. 8A is a functional block diagram of a portion of another controller circuit in accordance with the teachings of the present invention.
Figure 8B:
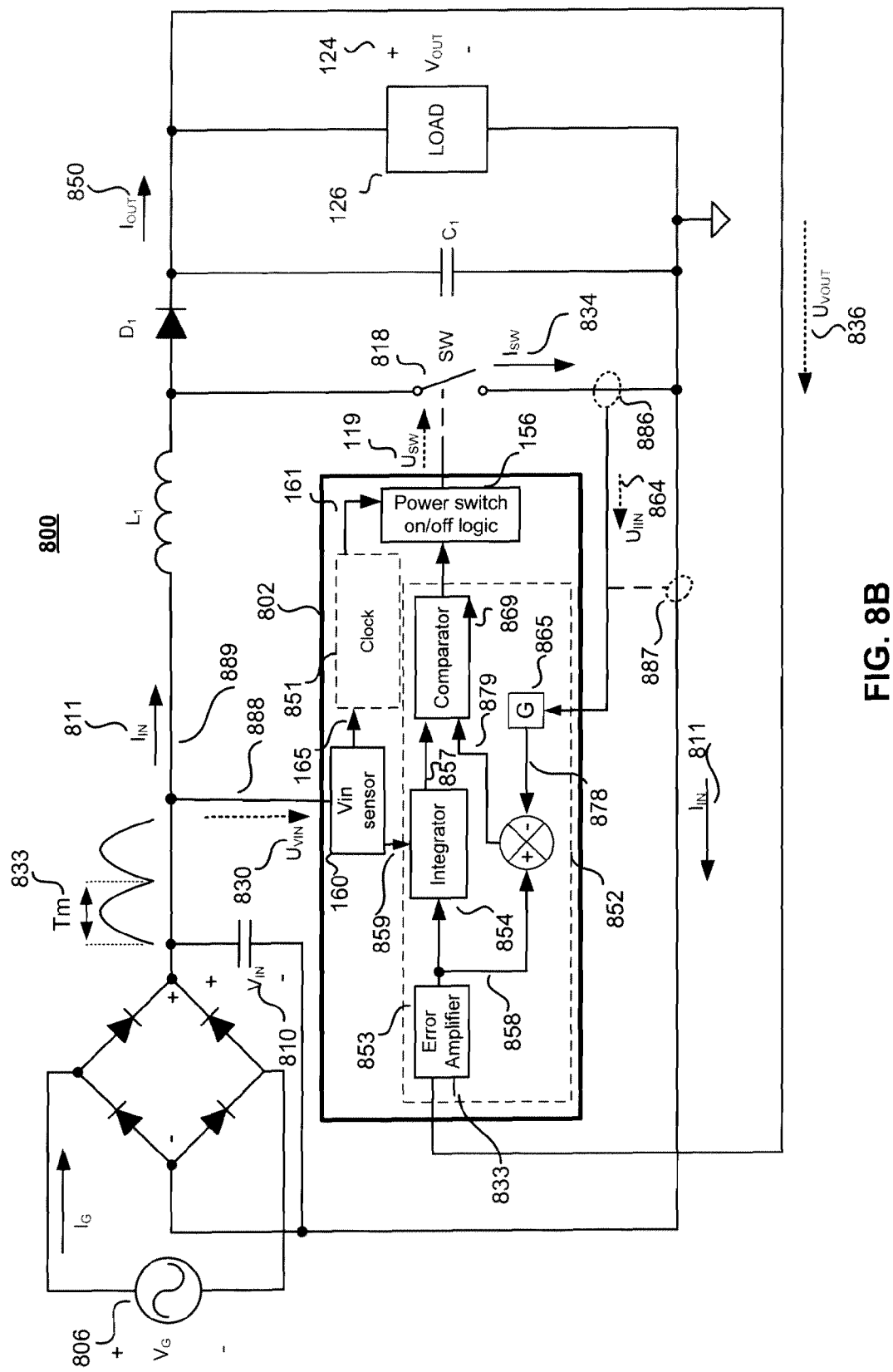
FIG. 8B illustrates an example schematic of a boost converter including another example controller in accordance with the teachings of the present invention.

The key circuit blocks of the "one cycle control" controller as it applies to the teachings of the present invention are shown in FIG. 8A, while FIG. 8B shows a functional block diagram of an example power controller 802 included in a power converter 800 in accordance with the teachings of the present invention. Each of the circuit elements shown in FIG. 8A appear in the above reference "One Cycle Control IC Simplifies PFC Designs," International Rectifier Corp., as presented at APEC 05 Conference, other than the input voltage sense signal 859.

The improvement of introducing input voltage sense signal 859, which in one example can be derived as shown in FIG. 8B from input voltage signal 830, are similar to those discussed above with reference to controllers 102 and 202 in FIGS. 1 and 2. It should be noted that in other examples, it is not necessary to have a connection 888 between voltage sensor 860 and the input voltage rail 889 in order to sense the input voltage. In such cases, the value of the input voltage can be derived by measuring the duty cycle of the power switch 818 or by measuring the slope of a current rise in the power switch 818 during an on time of the power switch 818. Such techniques can be used to sense input voltage and derive a peak, rms or average value of the input voltage without requiring a connection 888.

There follows a description of benefits of the teachings of the present invention applied to the key circuit blocks of a controller using a "one cycle control" scheme to provide a power factor correction function in a power converter such as a boost converter of the type shown in FIG. 8B. An example controller 802, in one example includes an integrator circuit 854, an error amplifier 853 and a comparator 869. As shown in the example circuit in FIG. 8A, a first input of the error amplifier 853 is coupled to receive a feedback signal 836 responsive to the magnitude of the dc output voltage of the power converter. A second input of the error amplifier 853 is coupled to receive a reference voltage 833. An output of the error amplifier 853 is coupled to a first input of the integrator circuit 854 and a second input of the integrator circuit 854 is coupled to receive a voltage sense signal 859 responsive to a magnitude of the ac voltage.

In one example the voltage sense signal is proportional to a square of the magnitude of the ac voltage 806 applied to the input of the power converter 800 in which the controller 802 is used. An output of the integrator circuit 854 is coupled to apply the integrator output signal 857 to a first input of the comparator 869. A second input of the comparator 869 coupled to receive a signal responsive to the output of the error amplifier 853, $V_{ERR}$ 858, and a signal 864 generated by sensing the current flowing in a power switch when the power switch is on.

It is noted that "one cycle control" controllers often sense the input current flowing in the converter as shown by way of example by alternative current sensor 887 location. However, during the on time of the power switch 818, the current sensed by current sense elements 886 and 887 are substantially the same. Since a current sense signal responsive to current flowing during the on time of power switch is being used by controller 802 with respect to the teachings of the present invention, either power converter 800 input current 811 or power switch current 834 can be sensed. In one example the power switch 818 is coupled as shown in the boost converter of FIG. 8B. It will be noted that other power converter topologies can be used as discussed later with reference to FIG. 11.

In the examples of FIGS. 8A and 8B, the current sense signal 864 is processed through a gain stage 865 to generate an amplified signal 878, which is subtracted from the $V_{ERR}$ signal 858. The resulting signal 879 is applied to the second input of comparator circuit 869. The signal applied to the second input of comparator 869 is therefore responsive to both the error signal 858 and current sense signal 864.

The "one cycle control" controller, for example controller 802, of which the circuit blocks 801 of FIG. 8A is a portion, is coupled to terminate an on time of the power switch 818 when the magnitude of the second input signal 879 of the comparator 869 and the magnitude of the integrator output signal 857 are of substantially equal value. A gain of the integrator circuit 854 responsive to the voltage sense signal 859 is such that a rate of change of the integrator output signal during the on time of the power switch is substantially constant independent of the magnitude of the ac input voltage, which in one example is $V_G$ 806.

Figure 9:
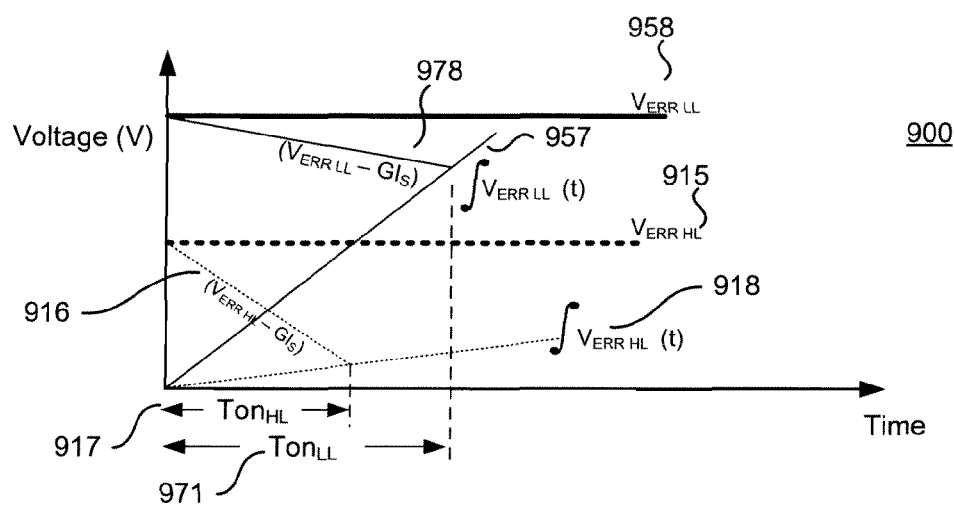
FIG. 9 shows voltage versus time characteristics to illustrate the operation of a typical one cycle control controller circuit.
Figure 10:
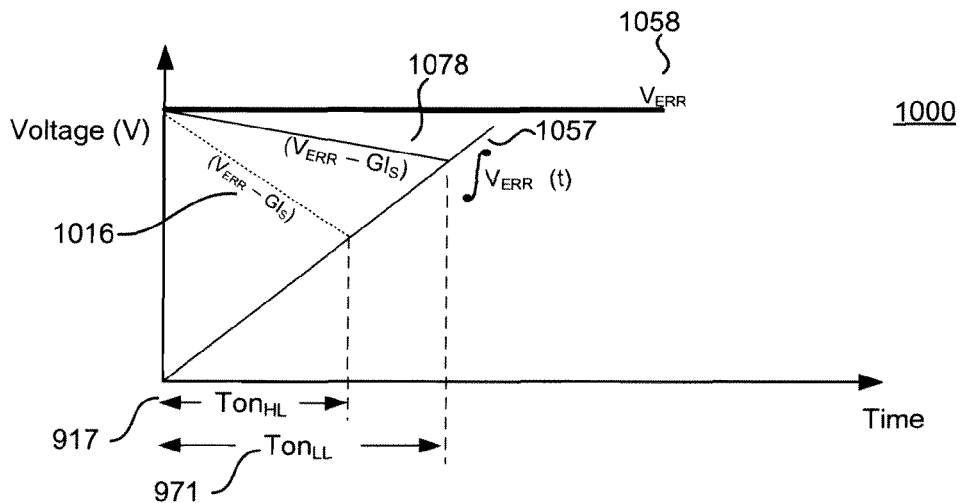
FIG. 10 shows voltage versus time characteristics to illustrate the operation of the functional block diagrams of FIGS. 8A and 8B in accordance with the teachings of the present invention.

The benefits of the present invention applied to a "one cycle control" scheme are further illustrated in FIGS. 9 and 10. In particular, FIG. 9 shows example characteristics in a standard "one cycle control" scheme where input voltage sense signal 859 is not applied to the integrator 854. FIG. 9 shows two sets of curves one for low line (LL) and one for high line (HL) corresponding to low and high input ac voltages to the PFC power converter.

The error signal $V_{ERRLL}$ 958 at low ac input voltage is substantially different to error signal $V_{ERRHL}$ 915 at high ac input voltage. This occurs because the integrated error signal output waveforms 957 and 918 are very different depending on the ac input voltage. In order to achieve the correct power switch on time $Ton_{HL}$ 917 at high input ac voltage, the error signal 915 has to be greatly reduced at high line compared to its value 958 at low line.

In comparison, FIG. 10 shows example curves generated by a circuit benefiting from the teachings of the present invention with the introduction of voltage sense signal 859 in FIG. 8. As shown, the error signal 858 can now remain constant resulting in the fact that the rate of change or slope of the integrator output signal 1057 during the on time of the power switch is substantially constant independent of the magnitude of the ac input voltage 806. The correct power switch on time $Ton_{HL}$ 917 can now be maintained with no change in error signal required in accordance with the teachings of the present invention.

The benefits of the teachings of the present invention as applied to the "one cycle control" scheme are similar to those applied to the controllers discussed earlier with respect to FIGS. 1 and 2, in that the error signal dynamic range is greatly reduced improving the control loop response and stability under variation conditions of output load and input ac voltage. In addition the error signal 1058 is a function of load and can be used for example to provide power switch switching cycle period variation as a function of load to improve light load efficiency of the power converter in which the controller is used.

Figure 11:
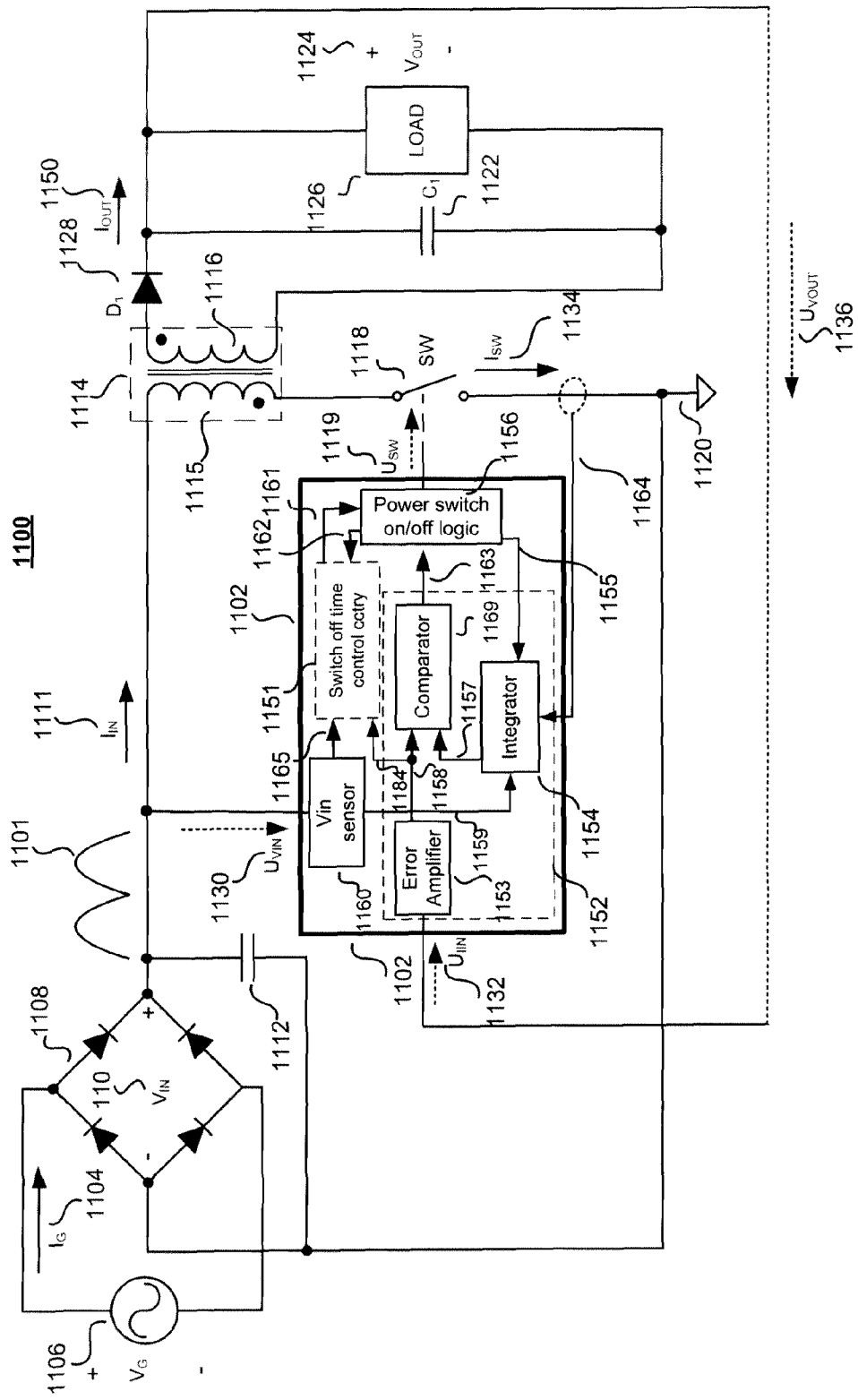
FIG. 11 illustrates an example schematic of a flyback converter including an example controller in accordance with the teachings of the present invention.

FIG. 11 shows generally another example power converter configuration 1100 using a controller benefiting from the teachings of the present invention. In the example illustrated in FIG. 11, the power converter topology is a flyback converter. The flyback converter 1100 can be used as a PFC converter stage and provides isolation between input and output load 1124, which can be a benefit in certain applications. The isolation in the path of the feedback signal 1136 is indicated by the dashed line in FIG. 11. The control circuit 1102 shares many aspects with the controllers of FIG. 1 and FIG. 2. In one example the only modifications to the internal control circuitry compared to controllers 102 and 202 in FIGS. 1 and 2 are in the switch off time control circuitry block 1151. Apart from that difference, the power switch 1118 on time control circuitry 1152 shares substantially all the aspects of control circuit blocks 152 and 252. In operation, current flows in energy storage element 1114 winding 1115 when power switch 1118 is on and current flows in energy storage element 1116 winding and output diode $D_1$ 1128 for at least a portion of the time for which power switch 1118 is off. Current therefore flows in at least one winding 1115 of energy transfer element 1114 during an on time of the power switch 1118 and current flows in at least one winding 1116 of energy transfer element 1114 and an output diode 1128 during at least a portion of the time for which power switch 1118 is off.

It is understood that a "one cycle control" controller modified to benefit from the teachings of the present invention as described with reference to FIGS. 8A, 8B, 9 and 10 above could also be used in a flyback converter configuration similar to the example of FIG. 11.

Although only the boost and flyback converter topologies have been discussed above for explanation purposes, it is understood that the teachings of the present invention could be applied to many other topologies applicable for power factor correction such as buck-boost converters, buck converters, SEPIC converters and the like in accordance with the teachings of the present invention.

Figure 12:
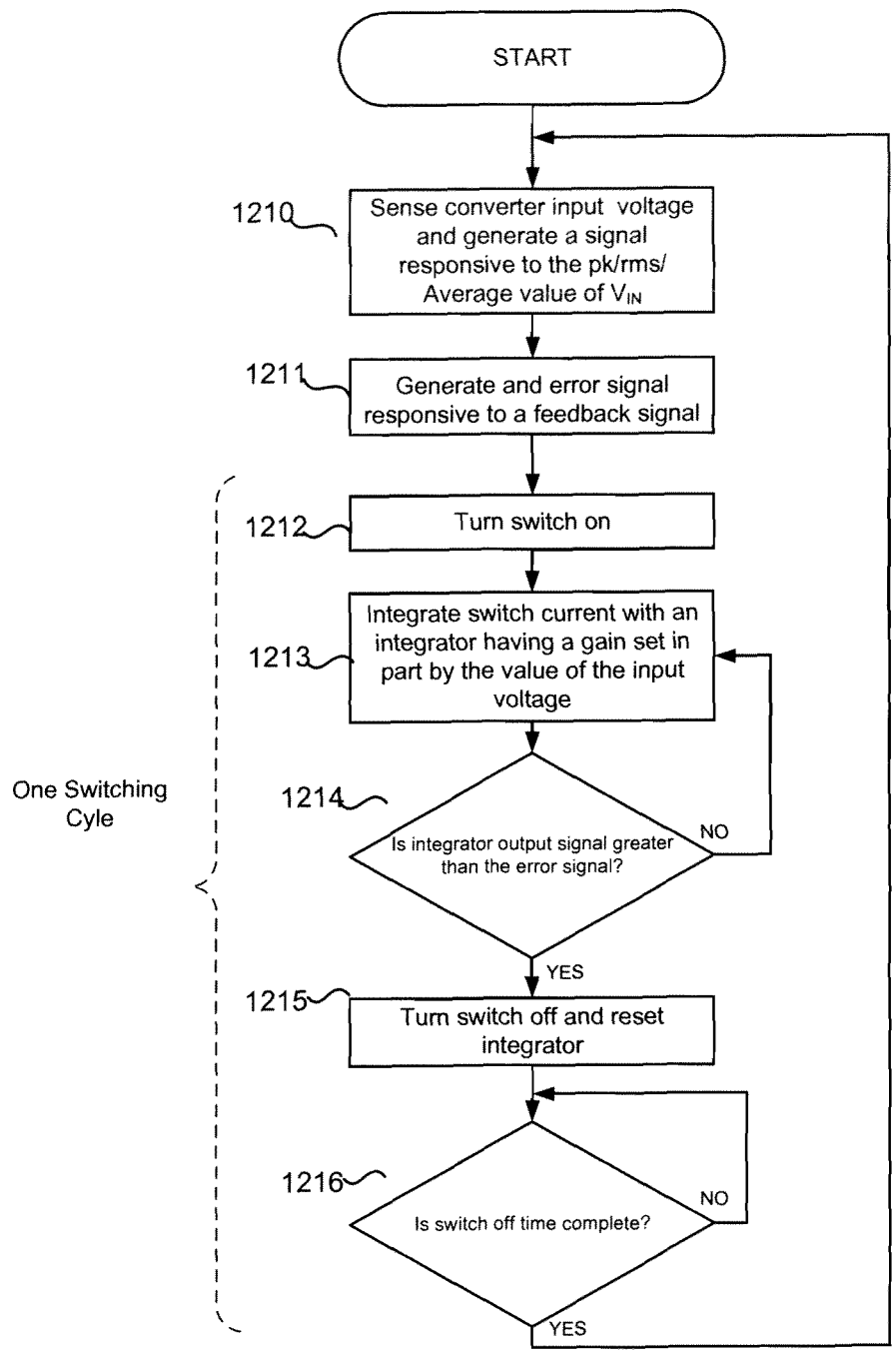
FIG. 12 is a flow diagram illustrating an example method for controlling a power factor correction circuit in accordance with the teachings of the present invention.

FIG. 12 is a flow diagram illustrating generally an example method for controlling a power factor correction circuit according to the teachings of the present invention. In a process block 1210, a converter input voltage is sensed and a signal responsive to a peak or rms or average value of that voltage is generated. More specifically in this example the generated signal is proportional to a square of the peak/rms or average input voltage. Next, in a process block 1211, an error signal responsive to a feedback signal is generated. In process block 1212 the power switch 118 is turned on. In process block 1213, a signal responsive to power switch current, for example signal 164, is integrated by an integrator circuit, such as for example integrator 154, with a gain set in part by the value of the input voltage signal generated in block 1210. In decision block 1214, the integrator output signal is compared to the error signal. If integrator output signal is not greater than the error signal, then the integration is continued in process block 1213. However, if integrator output signal is greater than the error signal, then the power switch, such as for example power switch 118, is turned off and the integrator circuit is reset in block 1215. In decision block 1216 it is determined when the power switch off time is complete. When it is complete, the flowchart returns to block 1210.

Figure 13:
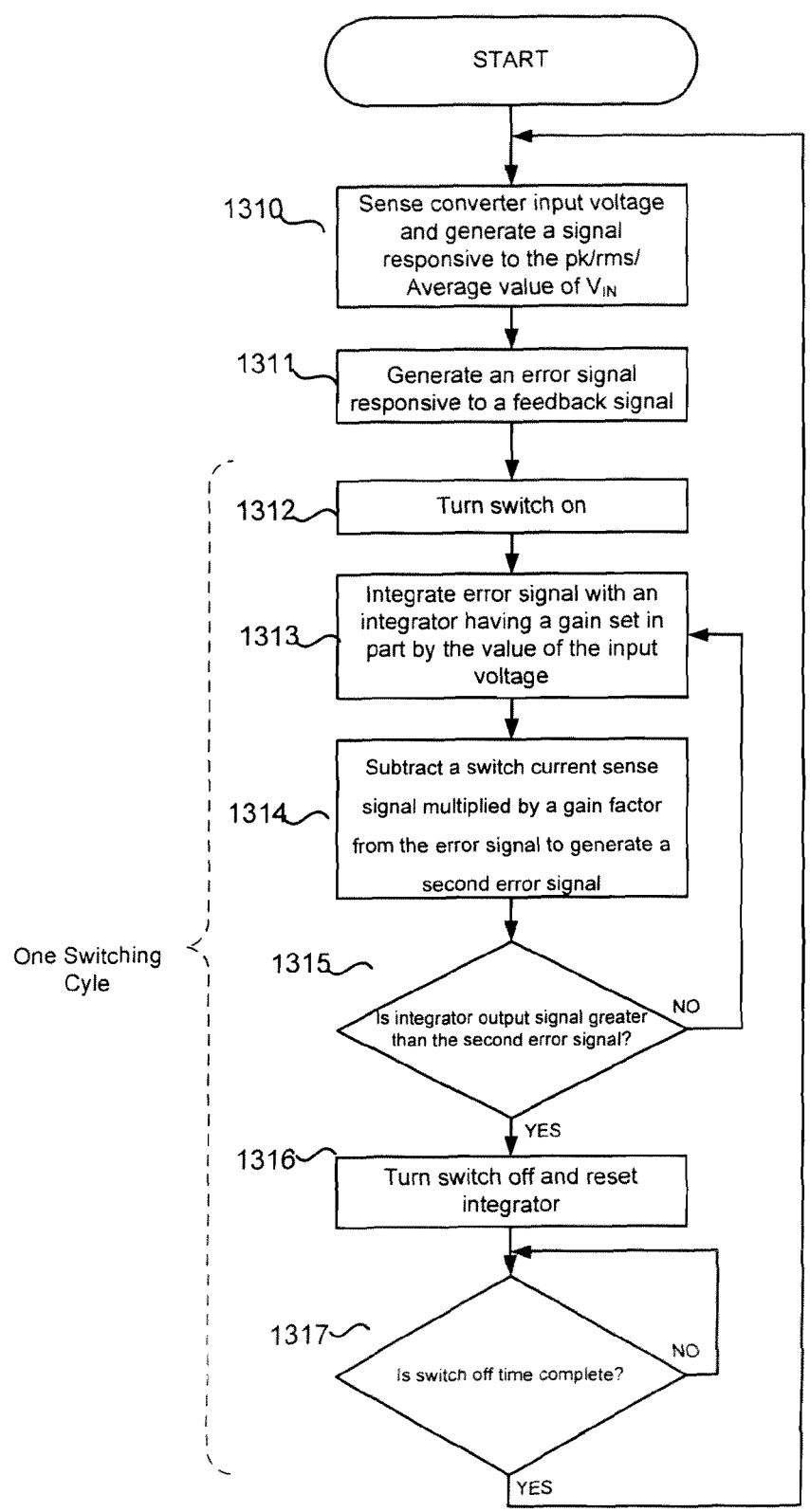
FIG. 13 is a flow diagram illustrating another example method for controlling a power factor correction circuit in accordance with the teachings of the present invention

FIG. 13 is a flow diagram illustrating generally another example method for controlling a power factor correction circuit according to the teachings of the present invention. In a process block 1310, a converter input voltage is sensed and a signal responsive to a peak or rms or average value of that voltage is generated. More specifically, in this example the generated signal is proportional to a square of the peak/rms or average input voltage. Next, in a process block 1311, an error signal responsive to a feedback signal is generated. In process block 1312, the power switch, such as for example power switch 118, is turned on. In process block 1313, the error signal, such as for example error signal 858, is integrated by an integrator circuit, such as for example integrator 854, with a gain set in part by the value of the input voltage signal generated in block 1310. In process block 1314, a current sense signal is multiplied by a gain factor and subtracted from the error signal generated in block 1311 to generate a second error signal. In decision block 1315, the integrator output signal is compared to the second error signal. If the integrator output signal is not greater than the second error signal, the integration of the first error signal is continued in process block 1313. However, if the integrator output signal is greater than the second error signal, the power switch is turned off and the integrator circuit is reset in block 1316. In decision block 1317, it is determined when the power switch off time is complete. When it is complete, the flowchart returns to block 1310.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim 1nterpretation. The present specification and figures are accordingly to be regarded as illustrative rather than restrictive.

What is claimed is:

1. An on time control circuit for use in a power factor correction (PFC) controller to terminate an on time of a power switch in a PFC converter, the on time control circuit comprising:
   an amplifier coupled to generate an error signal that is representative of a difference between a feedback signal and a reference value, wherein the feedback signal is representative of an output of the PFC converter;
   an integrator coupled to integrate a current sense signal that is representative of a current through the power switch to generate an integrator output signal, wherein a gain of the integrator is varied in response to a voltage sense signal that is representative of a value of an input voltage of the PFC converter, such that the error signal is the same for both a first value of the input voltage and a second value of the input voltage; and
   a comparator coupled to the integrator and to the amplifier to generate a switch power off signal to terminate the on time of the power switch in response to comparing the integrator output signal with the error signal.

2. The on time control circuit of claim 1, wherein the gain of the integrator is varied in response to the voltage sense signal such that the error signal is substantially constant independent of the input voltage of the PFC converter.

3. The on time control circuit of claim 1, wherein the comparator generates the switch power off signal to terminate the on time of the power switch when a value of the integrator output signal reaches a value of the error signal.

4. An on time control circuit for use in a power factor correction (PFC) controller to terminate an on time of a power switch in a PFC converter, the on time control circuit comprising:
an amplifier coupled to generate an error signal that is representative of a difference between a feedback signal and a reference value, wherein the feedback signal is representative of an output of the PFC converter;
an integrator coupled to integrate a current sense signal that is representative of a current through the power switch to generate an integrator output signal, wherein a gain of the integrator is varied in response to a voltage sense signal that is representative of a value of an input voltage of the PFC converter; and
a comparator coupled to the integrator and to the amplifier to generate a switch power off signal to terminate the on time of the power switch in response to comparing the integrator output signal with the error signal, wherein the integrator comprises:
a capacitor coupled to the comparator, wherein a voltage across the capacitor is the integrator output signal; and
a current source coupled to charge the capacitor during the on time of the power switch, wherein a value of a current provided by the current source is responsive to both the current sense signal and the voltage sense signal.

5. The on time control circuit of claim 4, wherein the integrator further comprises a transistor coupled to reset the capacitor at the start of each on time of the power switch.

6. The on time control circuit of claim 4, wherein the voltage sense signal is representative of a value of the input voltage of the PFC converter selected from the group consisting of: a peak value of the input voltage, an rms value of the input voltage, and an average value of the input voltage.

7. A power factor correction (PFC) controller for use in a PFC converter, the PFC controller comprising:
an on time control circuit configured to generate a switch power off signal to terminate an on time of a power switch of the PFC converter, the on time control circuit including:
an amplifier coupled to generate an error signal that is representative of a difference between a feedback signal and a reference value, wherein the feedback signal is representative of an output of the PFC converter;
an integrator coupled to integrate a current sense signal that is representative of a current through the power switch to generate an integrator output signal, wherein a gain of the integrator is varied in response to a voltage sense signal that is representative of a value of an input voltage of the PFC converter, such that the error signal is the same for both a first value of the input voltage and a second value of the input voltage; and
a comparator coupled to the integrator and to the amplifier to generate the switch power off signal in response to comparing the integrator output signal with the error signal; and
on/off logic coupled to the on time control circuit to generate a switching signal to control switching of the power switch, wherein the on/off logic terminates the on time of the switch in response to the switch power off signal.

8. The PFC controller of claim 7, wherein the gain of the integrator is varied in response to the voltage sense signal such that the error signal is substantially constant independent of the input voltage of the PFC converter.

9. The PFC controller of claim 7, wherein the comparator generates the switch power off signal to terminate the on time of the power switch when a value of the integrator output signal reaches a value of the error signal.

10. A power factor correction (PFC) controller for use in a PFC converter, the PFC controller comprising:
an on time control circuit configured to generate a switch power off signal to terminate an on time of a power switch of the PFC converter, the on time control circuit including:
an amplifier coupled to generate an error signal that is representative of a difference between a feedback signal and a reference value, wherein the feedback signal is representative of an output of the PFC converter;
an integrator coupled to integrate a current sense signal that is representative of a current through the power switch to generate an integrator output signal, wherein a gain of the integrator is varied in response to a voltage sense signal that is representative of a value of an input voltage of the PFC converter; and
a comparator coupled to the integrator and to the amplifier to generate the switch power off signal in response to comparing the integrator output signal with the error signal, wherein the integrator comprises:
a capacitor coupled to the comparator, wherein a voltage across the capacitor is the integrator output signal; and
a current source coupled to charge the capacitor during the on time of the power switch, wherein a value of a current provided by the current source is responsive to both the current sense signal and the voltage sense signal; and
on/off logic coupled to the on time control circuit to generate a switching signal to control switching of the power switch, wherein the on/off logic terminates the on time of the switch in response to the switch power off signal.

11. The PFC controller of claim 10, wherein the integrator further comprises a transistor coupled to reset the capacitor at the start of each on time of the power switch.

12. The PFC controller of claim 7, wherein the voltage sense signal is representative of a value of the input voltage of the PFC converter selected from the group consisting of: a peak value of the input voltage, an rms value of the input voltage, and an average value of the input voltage.

13. The PFC controller of claim 7, wherein the PFC controller and the power switch are included in a single integrated circuit.

14. The PFC controller of claim 7, further comprising an off time control circuit coupled to the on/off logic to generate a power switch on signal to start a next switching cycle period of the power switch.

15. A power factor correction (PFC) converter, comprising:
an energy transfer element coupled to an input of the PFC converter;
a power switch coupled to the energy transfer element; and
a PFC controller coupled to the power switch, the PFC controller comprising:
an on time control circuit configured to generate a switch power off signal, the on time control circuit including:
an amplifier coupled to generate an error signal that is representative of a difference between a feedback signal and a reference value, wherein the feedback signal is representative of an output of the PFC converter;

an integrator coupled to integrate a current sense signal that is representative of a current through the power switch to generate an integrator output signal, wherein a gain of the integrator is varied in response to a voltage sense signal that is representative of a value of an input voltage of the PFC converter, such that the error signal is the same for both a first value of the input voltage and a second value of the input voltage; and a comparator coupled to the integrator and to the amplifier to generate the switch power off signal in response to comparing the integrator output signal with the error signal; and on/off logic coupled to the on time control circuit to generate a switching signal to control switching of the power switch, wherein the on/off logic terminates the on time of the switch in response to the switch power off signal.

16. The PFC converter of claim 15, wherein the gain of the integrator is varied in response to the voltage sense signal such that the error signal is substantially constant independent of the input voltage of the PFC converter.

17. The PFC converter of claim 15, wherein the comparator generates the switch power off signal to terminate the on time of the power switch when a value of the integrator output signal reaches a value of the error signal.

18. A power factor correction (PFC) converter, comprising:
an energy transfer element coupled to an input of the PFC converter;
a power switch coupled to the energy transfer element; and
a PFC controller coupled to the power switch, the PFC controller comprising:
an on time control circuit configured to generate a switch power off signal, the on time control circuit including:
an amplifier coupled to generate an error signal that is representative of a difference between a feedback signal and a reference value, wherein the feedback signal is representative of an output of the PFC converter;

an integrator coupled to integrate a current sense signal that is representative of a current through the power switch to generate an integrator output signal, wherein a gain of the integrator is varied in response to a voltage sense signal that is representative of a value of an input voltage of the PFC converter; and a comparator coupled to the integrator and to the amplifier to generate the switch power off signal in response to comparing the integrator output signal with the error signal, wherein the integrator comprises:
a capacitor coupled to the comparator, wherein a voltage across the capacitor is the integrator output signal; and
a current source coupled to charge the capacitor during the on time of the power switch, wherein a value of a current provided by the current source is responsive to both the current sense signal and the voltage sense signal: and on/off logic coupled to the on time control circuit to generate a switching signal to control switching of the power switch, wherein the on/off logic terminates the on time of the switch in response to the switch power off signal.

19. The PFC converter of claim 18, wherein the integrator further comprises a transistor coupled to reset the capacitor at the start of each on time of the power switch.

20. The PFC converter of claim 15, wherein the voltage sense signal is representative of a value of the input voltage of the PFC converter selected from the group consisting of: a peak value of the input voltage, an rms value of the input voltage, and an average value of the input voltage.

21. The PFC converter of claim 15, wherein the PFC controller and the power switch are included in a single integrated circuit.

* * * * *